3,509,113
Patented Apr. 28, 1970

3,509,113
PREPARATION OF ACRYLAMIDE-TYPE WATER-SOLUBLE POLYMERS
Daniel J. Monagle, Fairfax, Del., Walter P. Shyluk, Landenberg, Pa., and Verne W. Smith, Jr., Hopewell, Va., assignors to Hercules Incorporated, Wilmington, Del., a corporation of Delaware
No Drawing. Filed Aug. 14, 1967, Ser. No. 660,233
Int. Cl. C08f 3/90
U.S. Cl. 260—79.3
13 Claims

ABSTRACT OF THE DISCLOSURE

This case covers a precipitation process of making water-soluble acrylamide-type polymers. The process comprises dissolving acrylamide type monomer in a solvent and allowing the polymerization to occur to give polymers in readily filterable form. Either a binary solvent or a ternary solvent may be used. The binary solvent is acetone and water and the ternary solvent is acetone, tertiary butanol and water. The amount of acetone in the binary solvent is 30%–70% by weight thereof. The amount of acetone in the ternary solvent is 5%–65% by weight thereof. The amount of tertiary butanol in the ternary solvent is 65%–5% by weight thereof.

---

This invention relates to a precipitation process for preparing high molecular weight acrylamide-type polymers which are soluble in water but insoluble in the polymerization reaction medium employed.

By the term "high molecular weight polymer" as used herein is meant a polymer which has a reduced specific viscosity (RSV) of at least 4 (usually 5–15) when measured at 25° C. on 0.1% solutions of the polymer in 0.1 molar aqueous potassium chloride; when expressed in centipoises (cps.) this corresponds to a viscosity of at least 30 cps. in water.

The term "monomer" is used herein to mean total monomer unless otherwise indicated.

The term "polymer" is used herein to mean both homopolymers and copolymers.

The term "acrylamide-type monomer" is used herein to mean acrylamide and acrylamide substituted on the α-carbon atom or on the nitrogen atom; and the term "acrylamide-type polymer" is used herein to mean polymers of acrylamide and polymers of acrylamide substituted on the α-carbon atom or on the nitrogen atom; these include but are not limited to compounds having the formula:

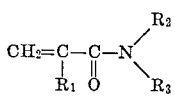

wherein $R_1$, $R_2$ and $R_3$ are each hydrogen or alkyl (particularly the lower alkyl), specific examples of which include acrylamide, methacrylamide, and N-isopropyl acrylamide.

The term "solvent" is used herein (with reference to the polymerization) to mean the liquid medium, including organic compounds and water, in which the polymerization reaction is carried out.

A method which is applicable in most cases for defining the molecular weight of polymers is a viscosity measurement. Depending on the type of polymer involved, this measurement is usually made when the polymer is in a molten condition or is dissolved in a suitable solvent. When the polymer is water-soluble, the methods most frequently employed for measuring the molecular weight are reduced specific viscosity (RSV) as measured in a capillary tube (e.g. an Ostwald or Ubbelohde tube) and apparent viscosity as measured by an instrument such as a Brookfield viscometer. Although the RSV method is accepted as a method for calculating the average molecular weight of a polymer, this method depends upon the polymer being completely soluble in the solvent used for the measurement as illustrated by the equation shown below in which $\eta_{sp}$ (i.e. the specific viscosity) is calculated $$RSV = \frac{\eta_{sp}}{C}$$

where $$\eta_{sp} = \frac{\eta - \eta_0}{\eta_0} = \frac{\eta}{\eta_0} - 1$$

from the measured flow time of the dilute polymer solution ($\eta$) divided by the flow time of the solvent ($\eta_0$), minus one. If the measurement is made before a homogeneous solution is attained, that measurement must be considered invalid unless special precautions are made to determine the exact concentration of the polymer in solution.

As is often the case with high molecular weight acrylamide-type polymers, completely homogeneous solutions cannot readily be obtained. Thus, the use of an RSV measurement alone may not adequately describe the molecular weights of the polymers involved. For this reason, it is desirable to give the Brookfield viscosities of those polymers whose aqueous solutions contain more difficultly soluble gels.

The method used to determine the RSV values given herein was as follows: 0.1 g. dry polymer is dissolved to mark in a 100 ml. volumetric flask with 0.1 M KCl. The temperature of the solution is allowed to equilibrate in a bath at 25° C. The solution is transferred to a Ubbelohde-type viscometer and the flow time between two points recorded. The specific viscosity, $\eta_{sp}$, is calculated from the measured flow time of the polymer solution divided by the flow time of the solvent alone, minus one (Equation 1).

$$\eta_{sp} = \frac{\eta - \eta_0}{\eta_0} = \frac{\eta}{\eta_0} - 1$$

(Equation 1)

or $$\eta_{sp} = \frac{t - \frac{c}{t}}{t_0 - \frac{c}{t_0}} - 1$$

where $c$ is a kinetic energy correction constant for the Ubbelohde viscometer.

The reduced specific viscosity is determined by dividing the concentration of the solution into the specific viscosity (Equation 2).

$$RSV = \frac{\eta_{sp}}{C}$$

(Equation 2)

Polymers which may be prepared according to the present invention include those represented by the following three structural formulas:

1. 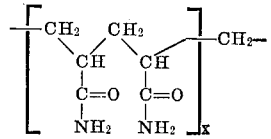

2. 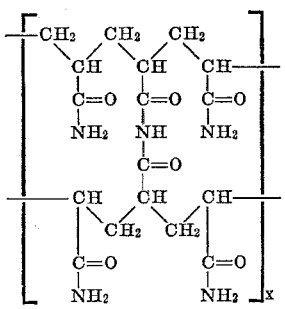

3. 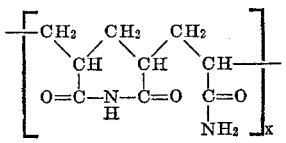

The actual structure of the polymer will depend upon whether the polymerization takes place in the normal head-to-tail manner so as to produce a linear polymer (structural Formula 1) or in a manner resulting in intermolecular or intramolecular imide formation (structural Formulas 2 and 3, respectively). As is shown above, structural Formulas 2 and 3 actually represent cross-linked materials. While linear polymers usually are quite soluble in water, cross-linked polymers are usually difficultly soluble in water. The degree of solubility and the viscosity will depend upon the degree of intermolecular and/or intramolecular cross-linking involved. It is well known that relatively small amounts of a divinyl monomer (included in a vinyl polymerization) produces polymers whose aqueous solutions have unusually high viscosity due to highly swollen gels resulting from a small number of cross-links. At the other extreme, polymers produced from larger amounts of divinyl monomers usually are insoluble, or swell to only a slight extent, and their aqueous solutions exhibit very low viscosity.

Although the prior art discloses numerous methods for preparing acrylamide-type polymers, relatively few of these are applicable for water-soluble polymers. One prior art type process for preparing such polymers is known as a solution-type process, having at least one virtue in that it enables the exothermic polymerization reaction to be controlled. However, these solution processes would be significantly improved if a way could be found to limit the viscosity increase of the reaction mixture during the polymerization. This would facilitate handling during the polymerization and enable the production of higher molecular weight polymers.

In the solution-type process, monomer is dissolved in an inert solvent and subsequently polymerized. The inert solvent may be an organic solvent or, in the case of water-soluble polymers, water. The reaction mixture thus obtained is quite viscous, the viscosity depending on the nature of the polymer, its concentration and its molecular weight. Such a mixture may be subsequently handled by any of the known techniques (i.e., roll drying, spray drying, precipitation and the like) to obtain a dry product. These techniques for isolation of product are usually inconvenient in that they are expensive, involving major equipment expenditures or require large volumes of precipitant.

Thus one of the chief objectives of a process for preparing polymers of the type of the present invention, and it is an extremely difficult objective to achieve, is a process in which the polymeric product is easily handled and recovered by simple conventional techniques. More particularly there is a substantial tendency for the polymeric product to be swollen, soft and tacky to an undesirable degree and also too much tendency for the particles of the polymeric product to agglomerate into undesirable large masses. Copending application Ser. No. 358,069, in the names of Daniel J. Monagle and Walter P. Shyluk as inventors, entitled Preparation of Acrylamide-Type Water-Soluble Polymers and filed Apr. 7, 1964, now U.S. Patent No. 3,336,269 goes a long way toward achieving this objective. The process of said copending application comprises a precipitation polymerization process wherein a certain tertiary butanol-water mixture is the solvent. Copending application Ser. No. 383,934, in the name of Daniel J. Monagle as inventor, entitled Preparation of Acrylamide-Type Water-Soluble Polymers and filed on July 20, 1964, now U.S. Patent No. 3,336,270 comes still closer to achieving this objective by carrying out the process of said first mentioned copending application in the presence of certain salts.

It has been found according to the present invention that the above and other objectives can be substantially more fully realized and that the limitations of the prior art solution type processes can be overcome or minimized in preparing water-soluble polymers by carrying out a precipitation process which comprises polymerizing acrylamide-type monomers, with or without one or more other monomers (and that ethylenically unsaturated) in solution in a solvent selected from the group consisting essentially of an acetone-water mixture and an acetone-tertiary butanol-water mixture, thereby giving polymeric products in the form of relatively unswollen, hard, nontacky granules which can be readily isolated from the polymerization reaction mixture by simple filtration, the amount of monomers being 5%–50% (preferably 20%–35%) by weight of the polymerization reaction mixture, the amount of acetone in said acetone-water mixture being by weight thereof 30%–70% (preferably 35%–50%), the amount of acetone in said acetone-tertiary butanol-water mixture being by weight thereof 5%–65% (preferably 30%–50%), and the amount of tertiary butanol in said acetone-tertiary butanol-water mixture being by weight thereof 65%–5% (preferably 30%–50%).

One way of analyzing the present invention is the substitution of acetone for a portion or all of the tertiary butanol in the solvent system of the above-identified copending applications. In addition to more fully accomplishing the objectives described above, this permits employing a higher monomer concentration and thereby substantially increasing the production capacity of any given plant. Higher monomer concentrations also permit the production of higher molecule weight polymers. In comparing the binary solvent of the present invention with the ternary solvent of the present invention, the former has the advantage of somewhat increased ease of overall plant operation and also lower operating cost because it eliminates any need of handling a ternary solvent mixture and of separating the acetone from the tertiary butanol. On the other hand the ternary solvent permits the production of somewhat higher molecular weight polymers, at a fixed monomer concentration. These higher molecular weight polymers can be produced in aqueous acetone by increasing the monomer concentration to higher levels than can readily be handled when the ternary solvent system or the solvent system of said copending applications are employed.

Monomers applicable in the present invention include (1) acrylamide-type alone or (2) acrylamide-type together with one or more of the following ethylenically unsaturated comonomers: (a) acrylonitrile, (b) monomers containing hydrophilic salt groups including ($b^1$) vinyl sodium carboxylates, e.g. sodium acrylate, sodium methacrylate, ($b^2$) vinyl sodium sulfonates, e.g. sodium ethylene sulfonate, ($b^3$) vinyl quaternary ammonium salts including those derived from dialkylaminoalkyl methacrylate (e.g. β-methacryloyloxyethyltrimethylammonium methyl sulfate), dialkylaminoalkyl acrylate, dialkylaminoalkyl vinyl ether, ($b^4$) vinyl pyridinium salts including those derived from 2-vinyl pyridine, 4-vinyl pyridine, 2-methyl 5-vinyl pyridine (e.g. 1,2-dimethyl-5-vinyl pyridinium methyl sulfate), 2-vinyl 5-ethyl pyridine, ($b^5$) vinyl sulfonium salts including those analogous to the quaternary ammonium salts in (b³) above, (c) vinyl monomers containing hydrophilic carboxylic acid groups, e.g. acrylic acid, methacrylic acid, and (d) a vinyl pyrrolidone.

Several of the conditions of the precipitation polymerization process of the present invention are critical and these conditions will now be discussed.

The solvent is critical and must be either (1) an acetone-water mixture or (2) and acetone-tertiary butanol-water mixture. Various other solvents were tried but found to be unsuitable.

In the binary solvent (acetone-water mixture) the concentration of acetone must be 30%–70%, preferably 35%–50%, by weight of said mixture. In the ternary solvent (acetone-TBA-water mixture) the concentration of acetone and TBA must be 5%–65% and 65%–5% respectively, by weight of said mixture and the combined organic portion of said ternary solvent should be about 30%–70% by weight of said mixture.

As is well known, the molecular weight of polymers varies directly with the monomer concentration used in making the polymer. If higher molecular weight polymers are desired, the monomer concentration should be about 15%–50%, preferably 20%–35%, by weight of the total polymerization reaction mixture. When the monomer concentration is above about 50%, the polymeric product forms as undesirably large, sticky gel particles instead of precipitating as desirably small, discrete particles according to the present invention. If low molecular weight polymers are desired, one would use monomer concentrations below about 10%. However, the polymerization becomes less practical as the monomer concentration goes below about 4%–5%. When using monomer concentrations below about 4%–5%, the polymeric product is apt to be produced in the form of a suspension instead of the desired precipitate in accordance with the present invention.

The monomers used must be soluble in the solvent mixtures and the polymeric products prepared from these monomers must be insoluble in said mixtures. As known in the art, these free radical type polymerizations must be carried out in the substantial absence of air, the usual methods for removing air from the polymerization system being employed, e.g. by nitrogen displacement.

Although polymerization temperature and time in accordance with the present invention are not critical nor per se a part of the present invention, they are significant as anyone skilled in the art will appreciate. As a general rule, which likewise is well known in the art, molecular weight varies inversely with temperature and, to a lesser extent, time.

The polymerization temperature is dependent on the particular initiator used in the system. Temperatures of about 20° C.–65° C. have given satisfactory results with potassium persulfate as an initiator in accordance with the present invention. Preferably a temperature of about 35° C.–45° C. will be employed. Temperatures below 20° C. can be used if the increase in time, for a satisfactory yield, can be tolerated. When the temperature is above about 65° C., the process of this invention is less practical because the polymerization must be carried out under pressure.

The polymerization reaction may be carried out either in the absence or presence of a polymerization initiator, but the use of a polymerization initiator is preferred. Both the amounts and types of free radical initiators applicable are well known in the art. If an initiator is used, amounts up to 0.5 weight percent, based on the monomer give good results. Preferably, the amount of initiator used will be about 0.05%–0.2%. Peroxy compounds, in general, function well as initiators. These peroxy compounds include, for example, ammonium persulfate, potassium persulfate, and hydrogen peroxide. α,α-Azobisisobutyronitrile also works well as an initiator. An initiator may be used alone or in combination with an activator to reduce

TABLE 1.—VARIABLE: ACETONE CONCENTRATION

| Example No. | Monomers Name | Concentration, percent[1] | Acetone concentration, percent[2] | Initiator Name | Initiator Concentration, percent[3] | Activator Name | Activator Concentration, percent[3] | Temp, °C. | Viscosity RSV[4] | Viscosity Cps.[5] | Remarks |
|---|---|---|---|---|---|---|---|---|---|---|---|
| 1 | 85% acrylamide, 15% MTMMS[6] | 21 | 24 | $K_2S_2O_8$ | 0.025 | None | | 50 | 5.6 | | Very viscous turbid mixture, inoperable. |
| 2 | do | 22 | 31 | $K_2S_2O_8$ | 0.025 | do | | 50 | 4.0 | | Slurry of grain particles of polymer, good results. |
| 3 | do | 25 | 38 | $K_2S_2O_8$ | 0.10 | TMEDA[7] | 0.10 | 45 | 7.5 | 400 | Do. |
| 4 | do | 25 | 45 | $K_2S_2O_8$ | 0.10 | TMEDA[7] | 0.10 | 45 | 8.8 | 520 | Do. |
| 5 | do | 25 | 55 | $K_2S_2O_8$ | 0.10 | TMEDA[7] | 0.10 | 45 | 6.8 | 160 | Do. |
| 6 | 90% acrylamide, 10% Na acrylate | 30 | 50 | $K_2S_2O_8$ | 0.10 | None | | 40 | 19.8 | 1,300 | Do. |
| 7 | do | 25 | 35 | $K_2S_2O_8$ | .075 | do | | 30 | 16.3 | 1,080 | Do. |
| 8 | do | 25 | 45 | $K_2S_2O_8$ | 0.10 | TMEDA[7] | 0.20 | 30 | 12.0 | 800 | Do. |
| 9 | 90% acrylamide, 10% acrylic acid | 20 | 50 | $K_2S_2O_8$ | 0.10 | TMEDA[7] | 0.10 | 40 | 20.3 | 400 | Do. |
| 10 | 90% acrylamide, 10% Na acrylate | 40 | 70 | $K_2S_2O_8$ | 0.10 | | | 40 | | 1,200 | Do. |

[1] Percent by weight of total polymerization reaction mixture.
[2] Percent by weight of acetone based on acetone-water mixture.
[3] Percent by weight based on monomers.
[4] RSV measured on a 0.1% solution of polymer in 0.1 M KCl at 25° C.
[5] Cps. measured on a 1% aqueous solution of polymer at 25° C. with standard Brookfield Snychro-Lectric LVF Viscometer.
[6] MTMMS = β-methacryloyloxyethyltrimethylammonium methyl sulfate.
[7] TMEDA = tetramethylethylenediamine.

TABLE 2.—VARIABLE: ACETONE AND TBA CONCENTRATION

| Monomers | | | | Initiator | | Activator | Temp., °C. | Viscosity | | Remarks |
| --- | --- | --- | --- | --- | --- | --- | --- | --- | --- | --- |
| Name | Concentration, percent [1] | Acetone concentration, percent [2] | TBA concentration, percent [2] | Name | Concentration, percent [2] | | | RSV [4] | Cps.[5] | |

Example No.:
| | | | | | | | | | | |
| --- | --- | --- | --- | --- | --- | --- | --- | --- | --- | --- |
| 11......85% acrylamide, 15% MTMMS [6] | 25 | 5 | 33 | $K_2S_2O_8$ | 0.10 | None | 45 | 14.7 | 1,040 | Slurry of grain particles of polymer, good results. |
| 12......do | 25 | 30 | 8 | $K_2S_2O_8$ | 0.10 | do | 45 | 14.1 | 895 | Do. |
| 13......do | 20 | 2.4 | 37.6 | $K_2S_2O_8$ | 0.10 | do | 45 | 20.8 | 1,070 | Do. |
| 14......do | 20 | 14.8 | 17.6 | $K_2S_2O_8$ | 0.10 | do | 45 | 16.3 | 1,170 | Do. |
| 15......80% acrylamide, 20% MTMMS [6] | 25 | 65 | 5 | $K_2S_2O_8$ | 0.01 | do | 45 | ---- | 940 | Do. |
| 16......79% acrylamide, 21% MTMMS [6] | 22 | 5 | 65 | $K_2S_2O_8$ | 0.10 | do | 45 | ---- | 430 | Do. |

[1] Percent by weight of total polymerization reaction mixture.
[2] Percent by weight of acetone based on acetone-TBA-water mixture.
[3] Percent by weight based on monomers.
[4] RSV measured on a 0.1% solution of polymer in 0.1 M KCl at 25° C.
[5] Cps measured on a 1% aqueous solution of polymer at 25° C. with standard Brookfield Synchro-Lectric LVF Viscometer.
[6] MTMMS=β-methacryloyloxyethyltrimethylammonium methyl sulfate.

TABLE 3.—VARIABLE: MONOMER

| Monomers | | | Initiator | | Activator | | Temp., °C. | Viscosity | | Remarks |
| --- | --- | --- | --- | --- | --- | --- | --- | --- | --- | --- |
| Name | Concentration, percent [1] | Acetone concentration, percent [2] | Name | Concentration, percent [2] | Name | Concentration, percent [3] | | RSV [4] | Cps.[5] | |

Example No.:
| | | | | | | | | | | |
| --- | --- | --- | --- | --- | --- | --- | --- | --- | --- | --- |
| 17......90% acrylamide, 10% acrylic acid | 25 | 40 | $K_2S_2O_8$ | 0.10 | TMEDA [6] | 0.20 | 40 | 11.6 | 250 | Slurry of grain particles of polymer—good results. |
| 18......90% acrylamide, 10% sodium acrylate | 25 | 40 | $K_2S_2O_8$ | 0.10 | None | ---- | 30 | 17.0 | 1,040 | Do. |
| 19......80% acrylamide, 20% acrylic acid | 25 | 40 | $K_2S_2O_8$ | 0.10 | TMEDA [6] | 0.20 | 40 | 11.1 | 200 | Do. |
| 20......70% acrylamide, 30% acrylic acid | 25 | 40 | $K_2S_2O_8$ | 0.10 | do [6] | 0.20 | 40 | 10.3 | 160 | Do. |
| 21......60% acrylamide, 40% acrylic acid | 25 | 40 | $K_2S_2O_8$ | 0.10 | do | 0.20 | 40 | 7.0 | 100 | Do. |
| 22......50% acrylamide, 50% acrylic acid | 25 | 40 | $K_2S_2O_8$ | 0.10 | do | 0.20 | 45 | 4.2 | 50 | Do. |
| 23......85% acrylamide, 15% MTMMS [7] | 25 | 40 | $K_2S_2O_8$ | 0.10 | None | ---- | 45 | 8.2 | 280 | Do. |
| 24......Acrylamide | 25 | 40 | $K_2S_2O_8$ | 0.20 | do | ---- | 45 | 8.0 | 300 | Do. |
| 25......90% acrylamide, 10% DMPMS [8] | 25 | 40 | $K_2S_2O_8$ | 0.20 | do | ---- | 40 | 6.0 | 90 | Do. |
| 26......80% acrylamide, 20% 1-vinyl-2-pyrrolidone | 25 | 40 | $K_2S_2O_8$ | 0.10 | do | ---- | 40 | ---- | 60 | Do. |
| 27......60% methacrylamide, 40% DMPMS [8] | 25 | 40 | $K_2S_2O_8$ | 0.10 | do | ---- | 40 | ---- | 40 | Do. |
| 28......Acrylamide | 25 | 40 | $H_2O_2$ | 0.092 | Thiourea | 0.456 | 30 | 14.2 | 195 | Do. |

[1] % by weight of total polymerization reaction mixture.
[2] % by weight of acetone based on acetone-water mixture.
[3] % by weight based on monomers.
[4] RSV measured on a 0.1% solution of polymer in 0.1 M KCl at 25° C.
[5] Cps measured on a 1% aqueous solution of polymer at 25° C. with standard Brookfield Synchro-Lectric LVF Viscometer.
[6] TMEDA=tetramethylethylenediamine.
[7] MTMMS=β-Methacryloyloxyethyltrimethylammonium methyl sulfate.
[8] DMPMS=1,2-dimethyl-5-vinyl pyridinium methyl sulfate.

TABLE 4.—VARIABLE: MONOMER CONCENTRATION

| | Monomers | | Initiator | | Activator | | Temp., °C | Viscosity | | Remarks |
|---|---|---|---|---|---|---|---|---|---|---|
| | Name | Concentration, percent [1] | Acetone concentration, percent [2] | Name | Concentration, percent [3] | Name | Concentration, percent [3] | | RSV [4] | Cps. [5] |
| Example No.: | | | | | | | | | | |
| 29 | 85% acrylamide, 15% MTMMS [6] | 15 | 40 | $K_2S_2O_8$ | 0.10 | None | | 45 | 7.3 | 185 | Slurry of grain particles of polymer, good results. |
| 30 | do [6] | 20 | 40 | $K_2S_2O_8$ | 0.10 | do | | 45 | 8.1 | 208 | Do. |
| 31 | do [6] | 25 | 40 | $K_2S_2O_8$ | 0.10 | do | | 45 | 9.0 | 323 | Do. |
| 32 | 90% acrylamide, 10% Na acrylate | 25 | 40 | $K_2S_2O_8$ | .05 | do | | 45 | 17.4 | 760 | Do. |
| 33 | do | 30 | 40 | $K_2S_2O_8$ | .05 | do | | 40 | 13.6 | 600 | Do. |
| 34 | do | 40 | 70 | $K_2S_2O_8$ | 0.10 | TMEDA [7] | | 40 | 20.3 | 1,200 | Do. |

[1] Percent by weight of total polymerization reaction mixture.
[2] Percent by weight of acetone based on acetone-water mixture.
[3] Percent by weight based on monomers.
[4] RSV measured on a 0.1% solution of polymer in 0.1 M KCl at 25° C.
[5] Cps. measured on a 1% aqueous solution of polymer at 25° C. with standard Brookfield Synchro-Lectric LVF Viscometer.
[6] MTMMS = β-Methacryloyloxyethyltrimethylammonium methyl sulfate.
[7] TMEDA = tetramethylethylenediamine.

TABLE 5.—VARIABLE: INITIATOR-ACTIVATOR SYSTEM

| | Monomers | | Initiator | | Activator | | Temp., °C | Viscosity | | Remarks |
|---|---|---|---|---|---|---|---|---|---|---|
| | Name | Concentration, percent [1] | Acetone concentration, percent [2] | Name | Concentration, percent [3] | Name | Concentration, percent [3] | | RSV [4] | Cps. [5] |
| Example No.: | | | | | | | | | | |
| 35 | 85% acrylamide, 15% MTMMS [6] | 25 | 40 | $K_2S_2O_8$ | 0.10 | None | | 45 | 7.3 | 185 | Slurry of grain particles of polymer, good results. |
| 36 | do [6] | 25 | 40 | $K_2S_2O_8$ | 0.10 | TMEDA [7] | 0.05 | 45 | 13.0 | 440 | Do. |
| 37 | do [6] | 25 | 45 | $(NH_4)_2S_2O_8$ | 0.10 | do [7] | 0.05 | 45 | 7.9 | 320 | Do. |
| 38 | do [6] | 25 | 40 | $K_2S_2O_8$ | 0.01 | $NaHSO_3$ | 0.05 | 45 | 6.0 | 140 | Do. |
| 39 | 90% acrylamide, 10% sodium acrylate | 25 | 40 | $K_2S_2O_8$ | 0.05 | TMEDA [7] | 0.05 | 40 | 22.0 | 1,400 | Do. |
| 40 | do | 25 | 40 | $K_2S_2O_8$ | 0.10 | do [7] | 0.10 | 25 | 19.6 | 1,040 | Do. |
| 41 | do | 25 | 40 | $H_2O_2$ | 0.025 | Thiourea | 0.05 | 30 | 19.0 | 980 | Do. |

[1] Percent by weight of total polymerization reaction mixture.
[2] Percent by weight of acetone based on acetone-water mixture.
[3] Percent by weight based on monomers.
[4] RSV measured on a 0.1% solution of polymer in 0.1 M KCl at 25° C.
[5] Cps. measured on a 1% aqueous solution of polymer at 25° C. with standard Brookfield Synchro-Lectric LVF Viscometer.
[6] MTMMS = β-methacryloyloxyethyltrimethylammonium methyl sulfate.
[7] TMEDA = tetramethylethylenediamine.

TABLE 6.—VARIABLE: TEMPERATURE

| | Monomers | | Initiator | | Activator | | Temp., °C | Viscosity | | Remarks |
|---|---|---|---|---|---|---|---|---|---|---|
| | Name | Concentration, percent [1] | Acetone concentration, percent [2] | Name | Concentration, percent [3] | Name | Concentration, percent [3] | | RSV [4] | Cps. [5] |
| Example No.: | | | | | | | | | | |
| 42 | 90% acrylamide, 10% sodium acrylate | 25 | 45 | $K_2S_2O_8$ | 0.075 | TMEDA [6] | 0.075 | 20 | 7.4 | 1,800 | Slurry of grain particles of polymer, good results. |
| 43 | do | 25 | 40 | $K_2S_2O_8$ | 0.10 | do [6] | 0.10 | 25 | 19.6 | 1,040 | Do. |
| 44 | do | 25 | 45 | $K_2S_2O_8$ | 0.10 | do [6] | 0.10 | 30 | 16.2 | 800 | Do. |
| 45 | 85% acrylamide, 15% MTMMS [7] | 25 | 45 | $K_2S_2O_8$ | 0.10 | do [6] | 0.10 | 45 | 8.5 | 520 | Do. |
| 46 | do | 24 | 39 | $K_2S_2O_8$ | 0.025 | None | | 50 | 5.7 | | |

[1] Percent by weight of total polymerization reaction mixture.
[2] Percent by weight of acetone based on acetone-water mixture.
[3] Percent by weight based on monomers.
[4] RSV measured on a 0.1% solution of polymer in 0.1 M KCl at 25° C.
[5] Cps. measured on a 1% aqueous solution of polymer at 25° C. with standard Brookfield Synchro-Lectric LVF Viscometer.
[6] TMEDA = tetramethylethylenediamine.
[7] MTMMS = β-Methacryloyloxyethyltrimethylammonium methyl sulfate.

the induction period of the polymerization reaction. Likewise, these activators are well known in the art. These activators form a redox system with an initiator. Sodium bisulfite, ferrous chloride, tetramethylethylenediamine, and thiourea activators have been used quite successfully in combination with potassium persulfate or hydrogen peroxide initiators in accordance with the present invention.

The following examples, wherein parts and per cent are by weight unless otherwise indicated, illustrate various specific embodiments of the present invention. When both monomer and initiators are used they are dissolved in the solvent. Air was removed from the polymerization reaction vessel by displacement with nitrogen or by refluxing at a reduced pressure. Activator, when used, was added at this time. The polymerization was carried out under the temperature, time and other conditions specified in Tables 1–6 hereinafter. Agitation was maintained throughout the polymerization. The polymerization reaction mixture was filtered, the polymeric product dried and its viscosity measured. Further details appear in Tables 1–6 above.

The polymerization reaction of the present invention may be carried out with or without the addition of one or more other materials thereto. For instance a surfactant may be employed. These surfactants lessen the chance of materials from the process adhering to and/or building up on the walls of the reactor and other equipment used. Although various surfactants are applicable, particularly good results have been obtained with water-soluble cellulose ethers including hydroxyethyl cellulose. The use of surfactants in this art is well known. Likewise the manner of using surfactants and amounts thereof are well known and are not critical.

The polymerization reaction of the present invention may be carried out either in the presence or absence of a salt, or a buffer system comprising one or more salts in combination with another material to complete the buffer system, the salt or buffer system being dissolved in the polymerization reaction mixture. These salts and buffer systems include, e.g., (1) alkali metal and ammonium acetates, carbonates, bicarbonates, chlorides, phosphates, sulfates, bisulfates, borates, (2) weak acids and their corresponding alkali metal and ammonium salts, (3) ammonium hydroxide in combination with its acetate, carbonate, bicarbonate, chloride, phosphate, sulfate, bisulfate, and borate salts, or (4) combinations of (1)–(3) above.

The amount of salt which may be used is about 0.1%–2.0%, preferably about 0.2%–0.7%, by weight of the reaction mixture. If the amount of salt exceeds about 2.0%, usually there is a tendency for the granules of the polymeric product to agglomerate in the polymerization reaction mixture.

The manner of adding the salt and the point at which it is added are not critical. Of course, substantially all of the salt added should be in solution in the polymerization reaction mixture and it should be in solution throughout a substantial portion of the polymerization. The salt can be added either as an aqueous solution or it can be added directly as a solid to the monomer solution. For example, an N-normal salt solution in water can be prepared and the monomer dissolved in the aqueous salt solution. This solution can be then be diluted with the solvent to give the final polymerization reaction mixture. Instead of in the manner just described, the salt can be added directly to solution of the monomer in the solvent.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. Process of preparing water-soluble polymers comprising dissolving acrylamide-type monomer having the formula:

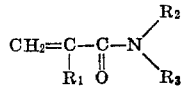

wherein $R_1$, $R_2$ and $R_3$ are each selected from the group consisting of hydrogen and lower alkyl in a solvent selected from the group consisting essentially of an acetone-water mixture and an acetone-tertiary butanol-water mixture and polymerizing to give polymers in readily filterable granular form,
   the amount of monomer being 5%–50% by weight of the polymerization reaction mixture,
   the amount of acetone in said acetone-water mixture being by weight thereof 30%–70%,
   the amount of acetone in said acetone-tertiary butanol-water mixture being by weight thereof 5%–65% and
   the amount of tertiary butanol in said acetone-tertiary butanol-water mixture being by weight thereof 65%–5%.

2. Process of claim 1 wherein the solvent is an acetone-water mixture and the amount of acetone is 30%–70% by weight of said mixture.

3. Process of claim 1 wherein the solvent is an acetone-tertiary butanol-water mixture and the amounts of acetone and tertiary butanol are, respectively, 5%–65% and 65%–5% by weight of said mixture.

4. Process of claim 3 wherein the combined amount of acetone and tertiary butanol is 30%–70% by weight of said solvent mixture.

5. Process of claim 1 wherein the polymerization is carried out in the presence of a salt disolved in the polymerization reaction mixture.

6. Process of claim 1 wherein the monomer is acrylamide.

7. Process of claim 1 wherein the monomer is a vinyl monomer containing hydrophilic salt groups together with acrylamide.

8. Process of claim 1 wherein the monomer is a vinyl quaternary ammonium salt together with acrylamide.

9. Process of claim 1 wherein the monomer is β-methacryloyloxyethyltrimethylammonium methyl sulfate together with acrylamide.

10. Process of claim 1 wherein the monomer is 1,2-dimethyl-5-vinyl pyridinium methyl sulfate together with acrylamide.

11. Process of claim 1 wherein the monomer is a vinyl pyrrolidone together with acrylamide.

12. Process of claim 1 wherein the monomer is acrylic acid together with acrylamide.

13. Process of claim 1 wherein the monomer is sodium acrylate together with acrylamide.

References Cited

UNITED STATES PATENTS

| | | | |
|---|---|---|---|
| 2,289,540 | 7/1942 | Dittman et al. | 260—89.7 |
| 2,741,652 | 4/1956 | Miller | 260—89.7 |
| 3,336,269 | 8/1967 | Monagle et al. | 260—79.3 |

JAMES A. SEIDLECK, Primary Examiner

U.S. Cl. X.R.

260—80.3, 89.7, 85.5

PO-1050
(5/69)

UNITED STATES PATENT OFFICE
CERTIFICATE OF CORRECTION

Patent No. __3,509,113__ Dated __April 28, 1970__

Inventor(s) __Daniel J. Monagle, Walter P. Shyluk and Verne W. Smith, Jr.__

It is certified that error appears in the above-identified patent and that said Letters Patent are hereby corrected as shown below:

Table 2, under the Column entitled "Initiator", -- Concentration percent$^2$ -- should read " Concentration percent$^3$ ".

Table 6, under the Column entitled " Viscosity ", -- 7.4 -- should read " 27.4 ".

Table 2, opposite Example No. 15, " 20% MTMMS " should read -- 20% MTMMS$^6$ --.

Table 3, opposite Example No. 27, " 40% DMPMD$^8$ " should read -- 40% DMPMS$^8$ --.

Table 3, Example 22 under Column headed by Activator, " do. " should read -- do.$^6$ --.

Table 3, Footnote 5, " Letcric " should read -- Lectric --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents